United States Patent [19]

Carson et al.

[11] Patent Number: 5,590,266
[45] Date of Patent: Dec. 31, 1996

[54] INTEGRITY MECHANISM FOR DATA TRANSFER IN A WINDOWING SYSTEM

[75] Inventors: Mark E. Carson; Mudumbai Ranganathan, both of Montogomery County; Janet A. Cugini, Frederick County; Khalid A. Asad, Frederick, all of Md.

[73] Assignee: International Business Machines Corporation, Armonk, N.Y.

[21] Appl. No.: 321,644

[22] Filed: Oct. 11, 1994

[51] Int. Cl.$^6$ .................................................. G06F 15/00
[52] U.S. Cl. ............................................. 395/340; 395/680
[58] Field of Search ................................. 395/155–161, 395/700

[56] References Cited

U.S. PATENT DOCUMENTS

| | | | |
|---|---|---|---|
| 4,903,218 | 2/1990 | Longo et al. | 395/157 |
| 5,073,933 | 12/1991 | Rosenthal | 380/25 |
| 5,075,884 | 12/1991 | Sherman et al. | 395/650 |
| 5,138,712 | 8/1992 | Corbin | 395/700 |
| 5,204,961 | 4/1993 | Barlow | 395/725 |

FOREIGN PATENT DOCUMENTS

| | | | |
|---|---|---|---|
| 0469709A2 | 6/1991 | European Pat. Off. | G06F 9/445 |
| 046791A2 | 7/1991 | European Pat. Off. | G06F 15/40 |
| 03268048 | 11/1991 | Japan | G06F 15/00 |
| 92/01263 | 1/1992 | WIPO . | |

OTHER PUBLICATIONS

Picciotto, "Towards Trusted Cutand Paste in the X Window System", IEEE, 1991, pp. 34–43.
Picciotto et al, "A Comparison of Trusted X Security Policies, Architectures, and Interoperability", IEEE, 1992, pp. 142–152.
Berger et al, "Compartment & Mode Workstation: Prototype Highlights", IEEE, 1990, pp. 608–618.
Epstein et al, "A Prototype B3 Trusted X Window System", IEEE, 1991, pp. 44–55.
Epstein et al, "Evolution of a Trusted B3 Window System Prototype", IEEE, 1992, pp. 226–239.
Epstein et al, "A Prototype for Trusted X Labeling Policies", IEEE, 1990, pp. 221–230.

*Primary Examiner*—Kee M. Tung
*Assistant Examiner*—John E. Breene
*Attorney, Agent, or Firm*—Whitham, Curtis, Whitham & McGinn; Mark S. Walker

[57] ABSTRACT

A secure process for untrusted windowing system client programs to transfer data between security domains is mediated by a special trusted client program, the Selection Manager. The mechanism used can be configured to meet the Compartmented Mode Workstation (CMW) requirements capability for regrading cut and paste operations. To meet the CMW cut and paste requirements and to prevent the regrading selection mechanism from acting as a covert channel, the regrading selection mechanism uses dummy window IDs in communicating to the lower level process during a Mandatory Access Control (MAC) upgrade operation, and for all regrading operations, an event is sent to the Selection Manager that causes the Selection Manager to put up a pop-up requesting user confirmation before the transfer is allowed to proceed. This selection mechanism supports configurable regrading selection operations for cutting and pasting (MAC upgrading for all users, MAC downgrading for privileged users, and information label upgrading and downgrading for all users).

8 Claims, 7 Drawing Sheets

Umac = Logged-in user MAC
Rmac = Requester Window MAC
Rdac = Requestor Window DAC
Ri = Requestor window Information level Omac = Owner Process MAC
Oid = Owner Process ID
Oi = Owner Process Information Label

The destination window is at a different mandatory access level. Should the selection transfer proceed?

Source window:      Window title
Source MAC:         Source window MAC
Destination window: Window title
Destination MAC:    Destination window MAC OK    Cancel

FIG.6

The destination window is at a different mandatory access level. Permission denied.

Source window:      Window title
Source MAC:         Source window MAC
Destination window: Window title
Destination MAC:    Destination window MAC Cancel

FIG.5

The owner of the data does not have write access to the requester's window or property. Proceed anyway?

OK          Cancel

FIG.7

 The data owner does not have write access to the destination window. Permission denied.

Source window:     Window title
Source owner:      Source owner name
Destination window: Window title
Destination owner:  Destination owner name Cancel

FIG.8

 How should the selection be labeled?

Destination window: Window title
Window label:       Window information label          Take
Window input label: Window input information label    Take
Client information label:   Client information label  Take
Selection label:    Current selection label (editable)

OK     View Data     Cancel

FIG.9

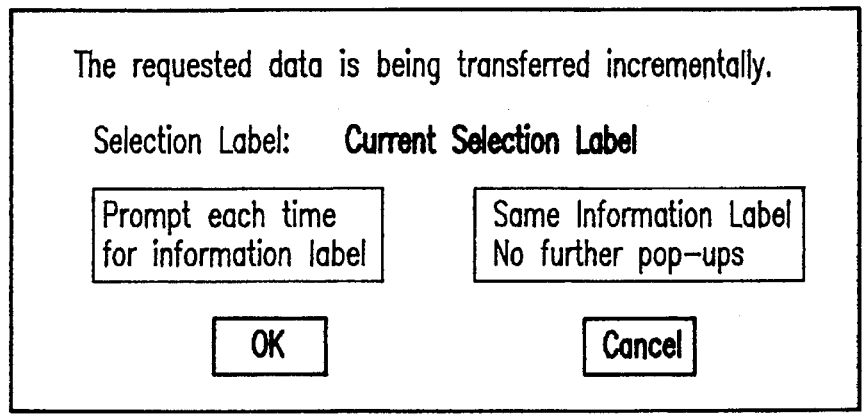
FIG.10
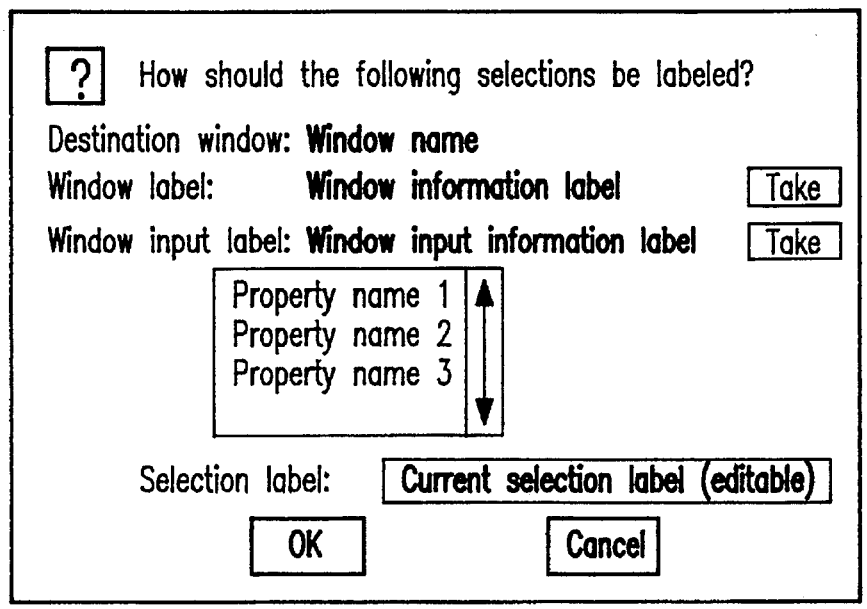
FIG.11
| Selection Name | Property Data Type |
|---|---|
| Change Information Level | Cancel |
| Selection Data ||
FIG.12

INTEGRITY MECHANISM FOR DATA TRANSFER IN A WINDOWING SYSTEM

BACKGROUND OF THE INVENTION

1. Field of the Invention

The present invention generally relates to the transfer of data using cut and paste operations in a computer windowing system and, more particularly, to a secure means for untrusted window system client programs to transfer data between security domains at the user's instigation under the user's control with the transfer mediated by a special client program.

2. Description of the Prior Art

Windowing systems are commonly used in computer systems to provide the user with a graphic user interface (GUI) to manage multitasked computer programs. A separate window is typically opened for each computer program currently running on the computer. The windowing systems provide the user with a number of tools to facilitate, among other things, the transfer of data from one document generated by one program to another document prepared by a different and unrelated program. On of these tools is the so-called "cut and paste" operation where data is bracketed in one window and moved to and inserted in another window. These operations are typically implemented using a cursor controlled by a mouse. One windowing environment currently in use is "The X Window System" (trademark of Massachusetts Institute of Technology) which runs on the Unix operating system developed by AT&T Bell Laboratories. (Unix is a trademark of Novell.)

Security labeling is one of the basic requirements of the Defense Intelligence Agency's (DIA) Requirements for System High and Compartmented Mode Workstations (Referred to as the CMW Requirements). These requirements in particular deal with secure multi-level windowing systems for workstations, where several windows with potentially different security levels can be open at any given time. The security levels for these windows are controlled with security labels, that is, Mandatory Access Control (MAC) labels that indicate the overall sensitivity level associated with a subject or object, and a finer granularity of labels called information labels that label aggregates of data. The sensitivity or MAC levels are enforced with the "no read up" (no reading of objects at higher sensitivity levels) and "no write down" (no writing to objects at lower sensitivity levels) rules for all users except privileged users. Because of this "no read up" rule, ordinary users have a tendency to work at as high of a sensitivity level as possible, so that they can see everything. But because of the "no write down" rule, all objects, no matter how trivial their contents, must be labeled at that same high sensitivity level. In order to prevent this over classifying of data, CMW provides for a system of information labels that give some indication of the "true" sensitivity of the data. Information labels are both user controlled and system controlled; users set them originally and may change them as needed while the system updates them through propagation or floating; that is, as a process reads sensitive data, its own (process) information label floats to the maximum (least upper bound) of the information labels of all the data it has read, and when it subsequently writes to other objects, their information labels, assuming they are allowed to receive the data, also float in a similar fashion.

Performing interwindow movements of data when the sensitivity and information labels are at different security levels is one of the basic features which makes CMW useful. However, all interwindow moves must conform to the "no read up, no write down" rules indicated above. Specifically, the regrading of labels through cut and paste operations can only be performed as follows: all privileged and ordinary users are allowed to upgrade MAC labels, only privileged users are allowed to downgrade MAC labels, and all privileged and ordinary users are allowed to upgrade or downgrade information labels. CMW requires that this be done in an interactive fashion, so that the user is cognizant of any label changes.

The X Window System consists of an X Server and a number of application programs which perform various functions. The X Server communicates with these applications through the sending of events which are generated as a result of user inputs. In the X Window System, the X Server merely mediates cut and paste operations which are initiated and controlled by normally untrusted client programs such as Xterm. Another application which is directly involved with cutting and pasting operations is the Window Manager. The Window Manager is responsible for most of the visual manipulations of windows.

SecureWare has a CMW on the market using the X Window System as a base, but it uses the Window Manager, not a separate client, for cutting and pasting operations. With SecureWare's implementation, only certain data types can be handled, and clients may surreptitiously change data after approval, or receive it before approval. Other than their own documents, there are no papers that have been published detailing their work and, in particular, nothing has been published on how to handle regrading cut and paste operations. Smith et al., in "Secure MultiLevel Windowing in a B1 Certifiable Secure UNIX Operating System", Winter 1989 USENIX Conference Proceedings, describe secure cut and paste operations on windows, but this work is not based on the X Window System and is solely concerned with MAC compliance. There is no concept of information labeling. Carson et al., in "From B2 to CMW: Building a Compartmented Mode Workstation on a Secure Xenix Base", Proceedings of the AIAA/ASIS/IEEE Third Aerospace Computer Security Conference, 1987, describes a CMW implementation, but this implementation uses XENIX as its operating system, Viewnix as its base windowing system, and the cutting and pasting operations use a completely different mechanism, entirely under central control. (XENIX is a trademark of Microsoft Corporation, and Viewnix is a trademark of Five Paces Software Inc.)

SUMMARY OF THE INVENTION

It is therefore an object of the present invention to provide a secure means for untrusted windowing system client programs to transfer data between security domains at the user's instigation and under the user's control, with the transfer mediated by a special trusted client program, the Selection Manager.

According to the invention, there is provided a mechanism that can be configured to meet the Compartmented Mode Workstation (CMW) requirements capability for regrading cut and paste operations. This mechanism can be used with any underlying operating system. To meet the CMW cut and paste requirements and to prevent the regrading selection mechanism from acting as a covert channel, the regrading selection mechanism solution of the invention has the following features:

The X Server uses dummy window IDs in communicating to the lower level process during a MAC upgrade operation.

For all regrading operations, the X Server will, before the selection has been transferred, send an event to the Selection Manager that causes the Selection Manager to put up a pop-up requesting user confirmation before the transfer is allowed to proceed.

This selection mechanism supports configurable regrading selection operations for cutting and pasting (MAC upgrading for all users, MAC downgrading for privileged users; information label upgrading and downgrading for all users). Because X Window selections involve mediated two-way communication, the following features are also provided by the secure selection mechanism to prevent their usage as a "covert" channel (and also to meet CMW cut-and-paste requirements):

1. The Selection Manager creates and makes available to the selection owner a special window and property which inherit the selection owner's security attributes. In this way, the window and property IDs that were specified by the requester of the selection are concealed from the selection owner. This is done so that the owner of the selection never obtains any security relevant information about the requester when the requester is communicating with a lower level process on a MAC upgrade.

1a. The selection owner transfers the selection data to the Selection Manager by the usual X mechanisms. The Selection Manager now becomes the owner of the data and has exclusive rights to it until the transfer is completed.

2. A user interface is provided that allows the logged in user to examine the data being transferred from the selection owner to the selection requester. It also allows the user to cancel an incremental transfer at any time and, for regrading operations, requests user confirmation before the data transfer is allowed to proceed.

2a. If the user confirms the transfer, the Selection Manager transfers the data to the requester. A new protocol request is used to effect the transfer "in place" to avoid having to make a second copy.

3. Appropriate audit events are generated when operations involving the use of privilege (such as MAC downgrading) are attempted and also when security violations involving data transfers, reclassifications and use of privilege are committed.

4. The selection mechanism, if appropriately configured, has sufficient privilege to override discretionary access control (DAC) write access restrictions on the requester's window and property.

With the mechanism according to the present invention, all applications have write access to the regrading selection buffer. Data that is written into the selection buffer can be at a higher level than the selection, which causes the information label to float and a new event called a LabelChange event to be generated. When writing into a selection, the writing process becomes the "owner" of that selection buffer, and the selection buffer inherits the labels of the owner. If another application wants to ascertain who the holder of a particular selection is, None gets returned if the present holder of the selection is at a higher sensitivity level than the application requesting the information. This prevents the covert passage of information indirectly, via selection ownership patterns. The ability to copy the data within the selection buffer depends upon the holder's access privileges. An application cannot read the data in a selection if the selection buffer has a higher sensitivity level than the application requesting the information unless the application is privileged.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a facsimile of the pop-up MAC denial alert box displayed on a computer screen;

FIG. 6 is a facsimile of the pop-up dialog box displayed on a computer screen for upgrading/downgrading confirmation;

FIG. 7 is a facsimile of the pop-up DAC access check box displayed on a computer screen;

FIG. 8 is a facsimile of the pop-up DAC denial alert box displayed on a computer screen;

FIG. 9 is a facsimile of the pop-up label dialog box displayed on a computer screen;

FIG. 10 is a facsimile of the pop-up incremental transfer menu displayed on a computer screen;

FIG. 11 is a facsimile of the pop-up selection data label dialog box displayed on a computer screen; and FIG. 12 is a facsimile of the window appearance for viewing selection data on a computer screen.

DETAILED DESCRIPTION OF A PREFERRED EMBODIMENT OF THE INVENTION

The preferred embodiment of the invention is described in the environment of the X Window System, but it will be understood that the invention may be practiced in other windowing environments. The X Server and a new client according to this invention, called the Selection Manager, are used for all regrading cut and paste operations.

Figure 1:
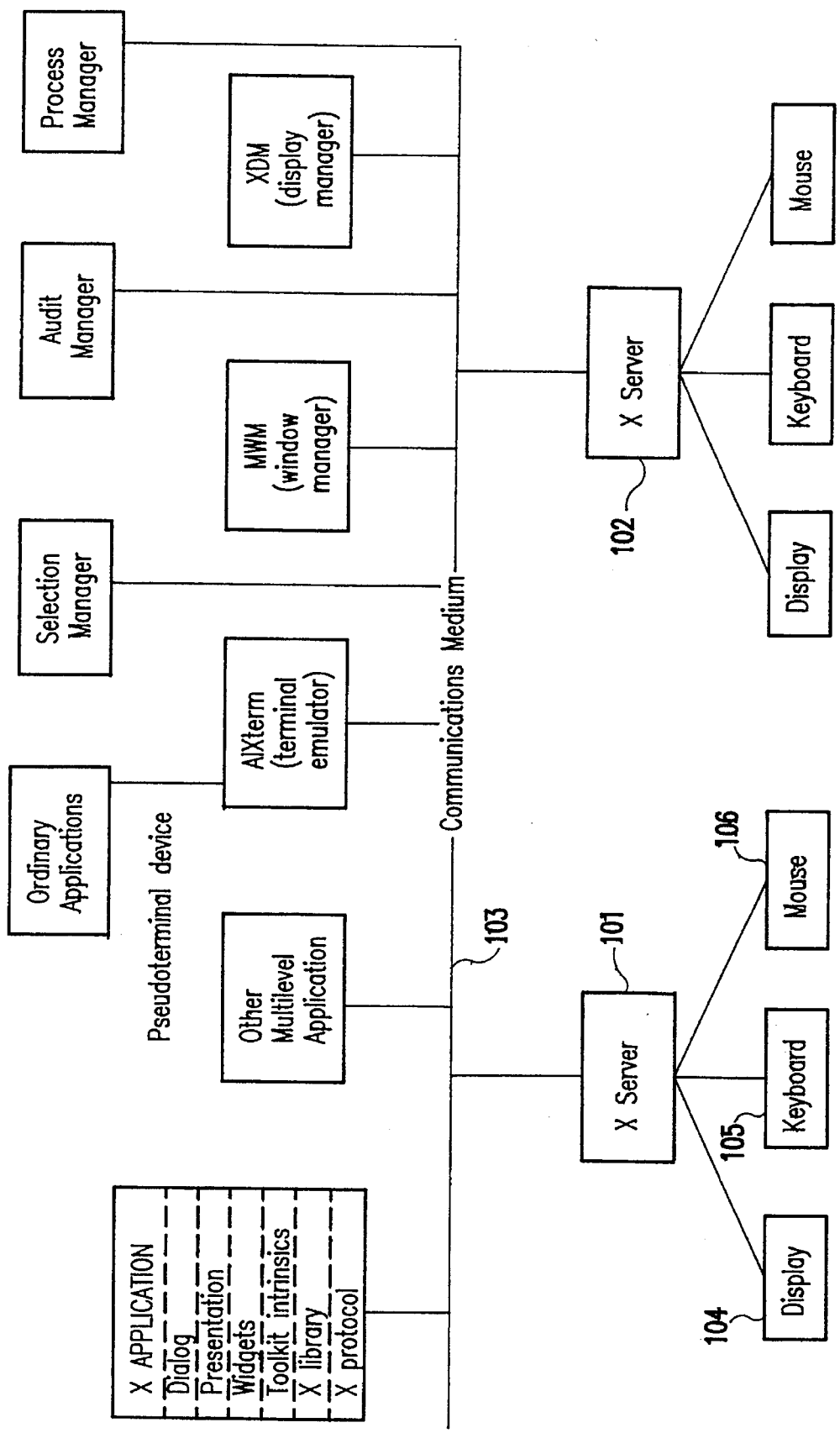
FIG. 1 is a block diagram illustrating the X Windows CMW architecture according to a preferred embodiment of the invention.

Referring now to the drawings, and more particularly to FIG. 1, there is shown the structure of the secure the X Window System for the architected CMW according a preferred embodiment of the invention, and shows the Selection Manager 100 as one of the new trusted clients. More particularly, the X Window system typically comprises a plurality of X Servers 101 and 102 connected by a communications medium 103, such as a local area network (LAN). Each X Server is provided with a display 104, a keyboard 105 and a mouse 106 by which a user interacts with the windowing system. Attached to the communications medium 103 are various applications and managers, including the new trusted client program according to the invention, the Selection Manager 100. Other managers include the Audit Manager 107, the Process Manager 108, the MWM window manager 109, and the XDM display manager 110. Besides the X application 111, there may be other multilevel applications 112 and ordinary applications 113 functioning as a pseudoterminal device and communicating with the communications medium 103 via an attached AIXterm terminal adapter 114. The X Server 101 or 102 must run on the same workstation the user is using. The clients may be on this machine or other machines as well.

(Typically, "special" clients like the windows manager 109 and Selection Manager 100 are run locally on the same machine, but this is not required.)

Selections are an X Window resource. With selections, applications can exchange data of arbitrary types and can negotiate the type of data to be exchanged. According to the Inter-Client Communications Conventions Manual (ICCCM), selections are the preferred method for inter-client cutting and pasting operations. Therefore, the solution according to the invention uses the selection resource as a base for the regrading cut and paste operations. The approach is compatible with the present use of the X selection resource since it does not change the X selection resource itself but inserts additional steps in between those presently being used for the transfer of data for the purpose of regrading the security labels. Thus, the solution acts as a natural extension of the existing selection resource.

The purpose of the X selection resource is to allow applications to share information. Each selection can only have one "owner", i.e., one holder of the token, at a time, so the owner can perform a cut or paste operation. If one application is cutting and another pasting, then the applications communicate with each other through pre-existing X Selection Request events. There can be an arbitrary number of selections which are global to the workstation. Each selection is named by an atom, owned by a client, and attached to a window.

The purpose of the regrading selection mechanism is to associate the proper MAC and information labels with the data being pasted. This can be performed in an interactive manner through the use of popups, or non-interactively through the setting configuration options in the Selection Manager's configuration resource file. In either case, the standard policies regarding the relabeling of data remains the same; that is, all privileged and ordinary users are allowed to upgrade MAC labels, only privileged users are allowed to downgrade MAC labels, and all privileged and ordinary users are allowed to upgrade or downgrade information labels. (The actual policy used is also configurable by the system administrator.) The following description shows how the regrading is performed in an interactive fashion, which is a CMW requirement so that the user is cognizant of any label changes.

Figure 2:
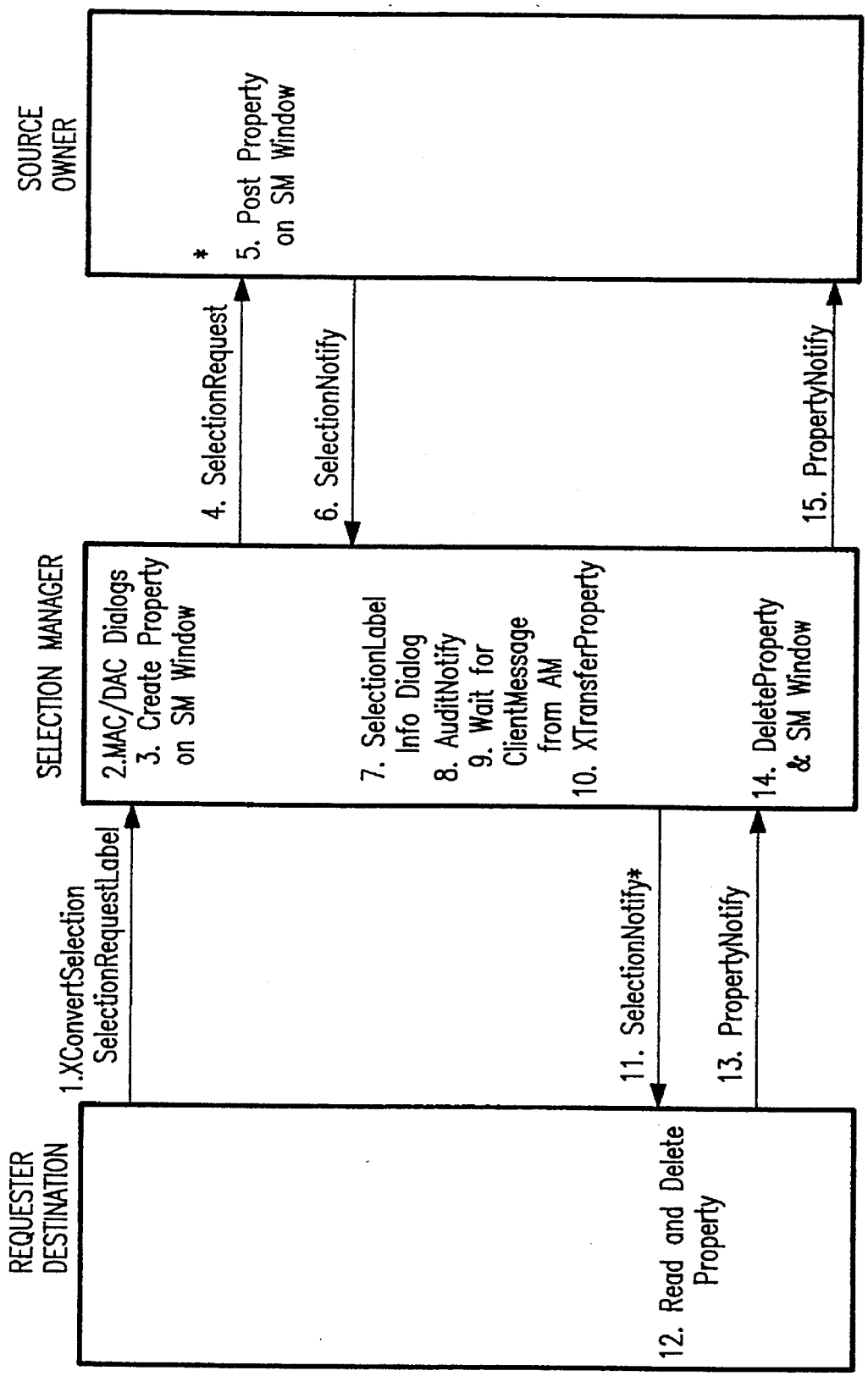
FIG. 2 is a block diagram illustrating the process in nonincremental cutting and pasting with auditing.

FIG. 2 illustrates non-incremental cutting and pasting. This means that only one transfer of data is being performed; that is, all the data is being transferred at the same time. In FIG. 2, the asterisk, *, means that Selection Manager sends this event using XSendEvent, while all other events are sent by the X Server. With incremental transfers, only parts of the data are being transferred at a given time, and certain checks have to be made for each of these transfers. We first discuss the non-incremental case with reference to FIG. 2, then the incremental cut and paste operations with reference to FIG. 3. Note that the X Server is involved in this process (all events sent by the X Server that do not have an asterisk next to them) even though the X Server is not shown in FIGS. 2 and 3. Also note that the discussion proceeds as if all configurable options are set; e.g., the pop-up menus described below may not appear if the system administrator has disallowed that option.

FIG. 2 shows the protocol between the Selection Requester and the Selection Owner in the modified protocol to request a selection request for a simple (non-incremental) selection. The first step is for the Requester to issue an XConvertSelection Protocol request which is converted by the X Server to a SelectionRequestLabel protocol request and forwarded to the Selection Manager as a SelectionRequestLabel event. The Selection Manager puts up the MAC and DAC dialogs as indicated by step 2 in the diagram. In step 3, the Selection Manager creates a property on its own window that the owner of the selection can later post the selection on. It then generates in step 4 a SelectionRequest which it sends to the originally intended recipient. This is a standard SelectionRequest event, and hence the recipient's code does not have to be altered to work in this environment.

The Selection Manager indicates its own property in this event. In response to this event, the selection owner posts the selection data on the Selection Manager's property in step 5 and issues a SelectionNotify event to the Selection Manager in step 6. The Selection Manager then allows the user to examine the data being passed from the Selection Owner to the Selection Requester in step 7. This allows the user to permit the request to pass unmodified, cancel the request or down grade the data being transferred. Cancellation of the request can cause an audit event to be generated in step 8. In this case, the Selection Manager waits for the audit record to be written out before proceeding. This is illustrated by step 9 in the dialog. In step 10, the Selection Manager uses the new XTransferProperty call to transfer the selection data from its own window/property to the selection requester's window/property. The Selection Manager then issues the SelectionNotify call in step 11 which results in the requester being notified of the selection's availability on the property that was specified in the original XConvertSelection call. In step 12, the Requester reads the data and then issues the XPropertyNotify call in step 13 which results in an event being sent to the Selection Manager. The Selection Manager cleans up its own data structures in step 14 and forwards the property notify to the owner in step 15. The owner can thus do whatever cleanup it needs to at this point. This completes a description of the steps involved in the handshake indicated in FIG. 2.

Figure 3:
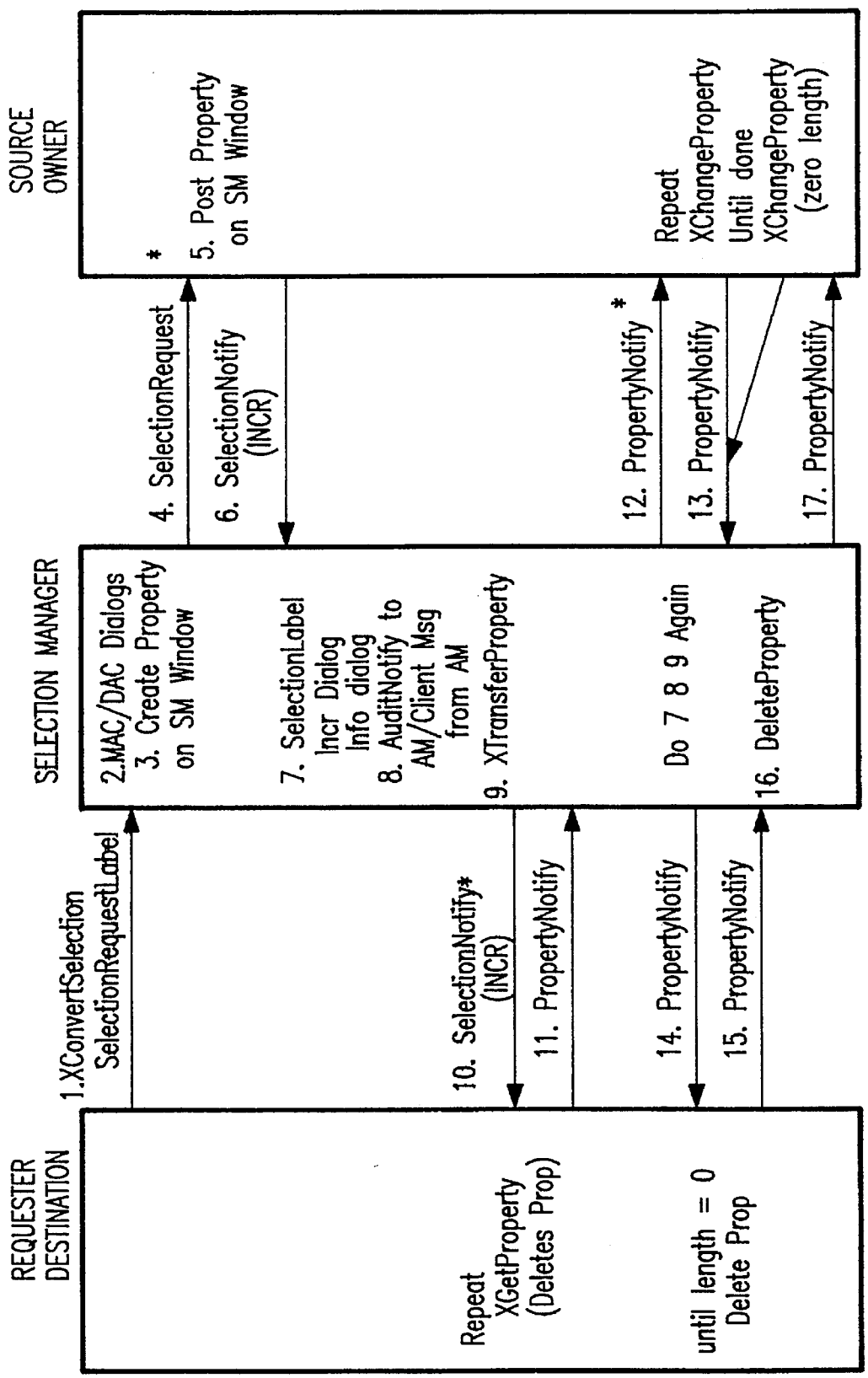
FIG. 3 is a block diagram illustrating the process in incremental cutting and asting with auditing.

FIG. 3 illustrates the handshake protocol that takes place when an incremental selection is being transferred. An incremental selection is one that is large enough that it makes sense to transfer it in multiple parts rather than a single one. The protocol begins by the requester first issuing a dummy property on its own window. The Requester issues an XConvertSelection Protocol request which is converted by the X Server to a SelectionRequestLabel protocol request and forwarded to the Selection Manager as a SelectionRequestLabel event. In step 2, the Selection Manager puts up the MAC and DAC dialogs, as in the nonincremental case. In step 3, the Selection Manager creates a property on its own window that the owner of the selection can later post the selection on. and puts up the MAC and DAC dialogs. The Selection Manager then forwards the request to the selection owner in step 4. In step 5, the selection owner (who is the one that is aware that this is an incremental selection) posts the property on the Selection Manager's window and then, in step 6, issues a SelectionNotify, informing the Selection Manager that this is an incremental (INCR) selection. The Selection Manager is thus aware that the data will arrive in (potentially) several parts. The Selection Manager then allows the user to examine the data being incrementally passed from the Selection Owner to the Selection Requester in step 7. Cancellation of the request can cause an audit event to be generated in step 8. In step 9, the Selection Manager uses the new XTransferProperty call to transfer the selection data from its own window/property to the selection requester's window/property. The Selection Manager then issues the SelectionNotify (INCR) call in step 10. The requester is thus aware that the data will arrive in potentially several parts. The actual transfer of data takes place using a series of ChangeProperty and PropertyNotify messages in steps 11 to 14. The Selection Manager gives the user the opportunity to examine and change the level of the data and cancel the selection at any time. The Selection Manager transfers each piece in turn just as for a single transfer. The only difference is that subsequent transfers are signaled by the requester reading and deleting the transferred data, rather than by the requester sending separate Xconvertselection requests.

The final step in the protocol is when the property owner posts a zero length property on the Selection Manager's (dummy)property, as indicated in step 13. This signals that the transfer is complete, and in response, the Selection Manager forwards this information to the Selection Requester in step 14. The Selection Requester will then realize the transfer is complete, and the housekeeping procedures as in the single transfer case in steps 15 to 17.

Figure 4:
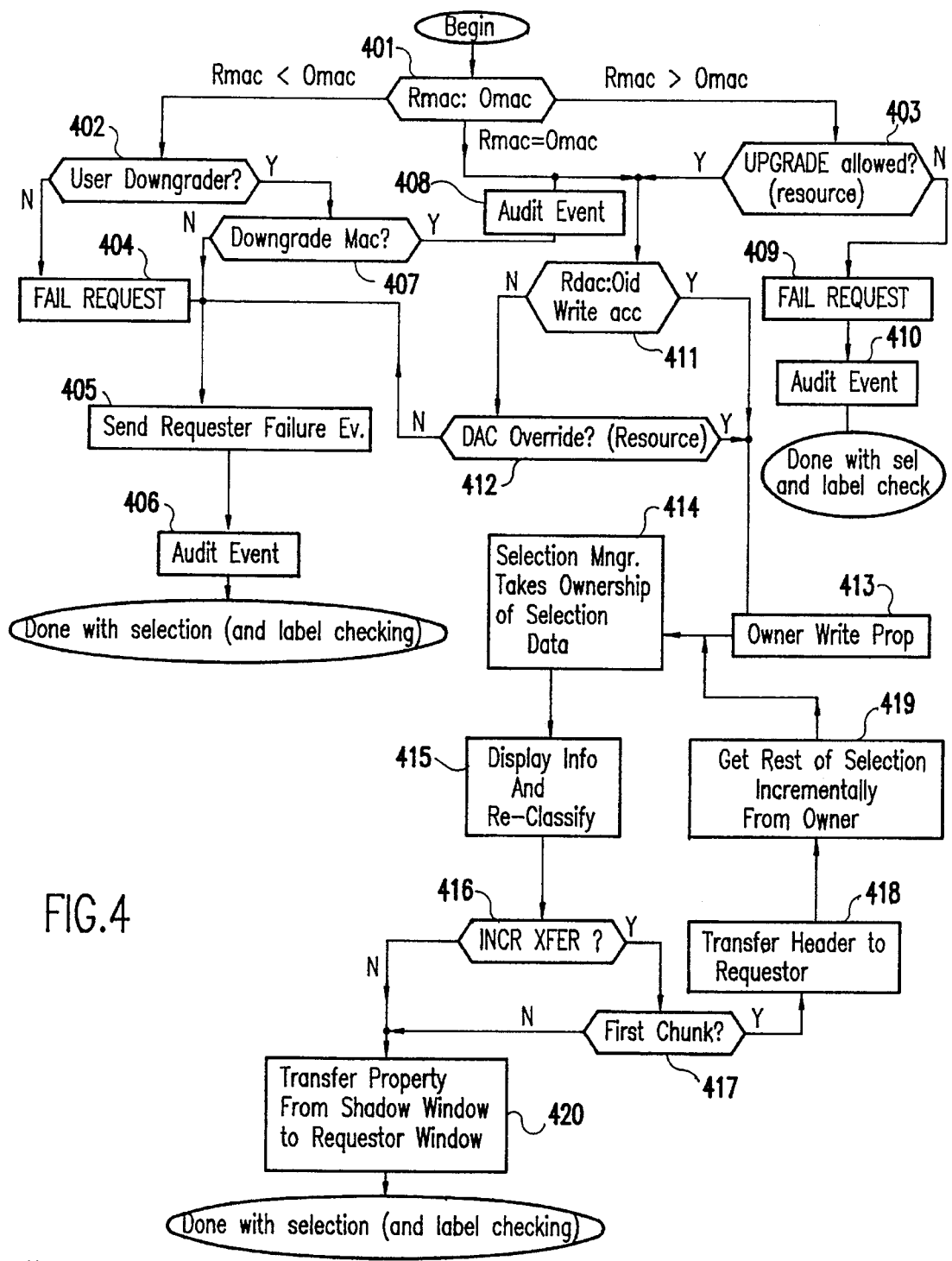
FIG. 4 is a flow diagram illustrating the logic of the data transfer process implemented by the invention.

The process is illustrated in the flow diagram of FIG. 4. In order for a data transfer to take place, the data owner must become the selection resource owner. Since selection atoms are public resources, any client can assert selection ownership. When a client wishes to receive this data, the client sends an XconvertSelection request to the owner of the data. When the X Server receives this Xconvertselection request, the X Server makes sure that the client making the request has the correct access to the requester's window and property it specifies as its destination. If so, the X Server forwards this SelectionRequest event as a new event called a SelectionRequestLabel event to the Selection Manager. This event contains the selection owner's MAC, user and group identifications (UID and GID) and the MAC labels and DAC attributes for the requester's window and property. The Selection Manager's behavior on receiving this event is configurable (i.e., is dependent upon the specifications in the system administrator's resource file), but the default behavior is that requests at the same MAC level pass the MAC access check (and they are unaudited).

With specific reference to FIG. 4, a test is first made in decision block 401 to determine if the requester's MAC (Rmac) is greater than, equal to, or less than the Owner's MAC (Omac). If the requester is at a different MAC level than the owner, the Selection Manager checks to see whether the user is a privileged downgrader in decision block 402 or if upgrading is allowed in decision block 403. In either case, the Selection Manager first obtains the user and group list that was posted as a root window property by the display manager (xdm) at user login. Then, in order to check for downgrading privilege, the Selection Manager makes an AIX tcl (Trusted Process Control List) function call (or, for other operating systems, a system call with a similar function), specifying itself as the trusted process, that it is checking for downgrading privilege, and the user identification (UID) and group identification (GID) as parameters. (AIX is a trademark of International Business Machines (IBM) Corporation and is IBM's version of the Unix operating system.)

Considering the case where a test is made in decision block 402 to determine if the user is a privileged downgrader, a determination that the user is not a privileged downgrader results in a failed request, as indicated by function block 404. The popup shown in FIG. 5 is displayed, and the requester is sent a failure event in function block 405 and the Selection Manager generates an audit event in function block 406 before a return is made to the system. On the other hand, if the user is a privileged downgrader, the popup shown in FIG. 6 is displayed prompting the user for downgrading confirmation. If the user selects "Cancel" from the popup, as determined in decision block 407, then the popup shown in FIG. 5 is displayed and the requester is sent a failure event in function block 405, and the Selection Manager generates an audit event in function block 406 before a return is made to the system. If the user selects "OK" from the popup shown in FIG. 6, an audit event is generated in function block 408, since downgrading is a use of authorization on behalf of the user.

Considering the case where a test is made in decision block 403 to determine if upgrading is allowed, a determination that upgrading is not allowed results in the display of the popup shown in FIG. 6. This is a MAC upgrade warning. If the user selects "Cancel", the popup shown in FIG. 5 is displayed and the requester is sent a failure event in function block 409, and the Selection Manager generates an audit event in function block 410 before a return is made to the system. On the other hand, if the user selects "OK" in the popup shown in FIG. 6 or in the case that the requester window MAC and the owner process MAC are equal as determined in decision block 401, a test is made in decision block 411 to determine if write access is requested. If not, the popup shown in FIG. 7 is displayed, prompting the user to indicate whether the transfer should proceed. If the user selects "Cancel" in the popup of FIG. 7, as determined in decision block 412, the popup shown in FIG. 8 is displayed. The requester is then sent a failure event in function block 405 and the Selection Manager generates an audit event in function block 406 before a return is made to the system. If the user selects "OK" in the popup shown in FIG. 7 or if write access is requested as determined by decision block 411, the owner writes the property in function block 413. In function block 414, the Selection Manager changes ownership of the property to itself, to prevent any further modification of the data. Then in function block 415, the popup shown in FIG. 9 is displayed, prompting the requester to provide label information for the requested data.

At this point, a test is made in decision block 416 to determine if this is an incremental (INCR) transfer. If so, a test is next made in decision block 417 to determine if this is the first part of the incremental transfer. If so, the popup shown in FIG. 10 is displayed prompting the requester to indicate whether there should be a prompt for an information label each data transfer. Whatever the requester's selection from the popup in FIG. 10, the header is first transferred to the requester in function block 418 and the rest of the selected data is obtained incrementally from the owner in function block 419, following the protocol described with respect to FIG. 3, and the process loops back through function block 414. If the requester selects prompting each time for an information label, the popup shown in FIG. 11 will be displayed with each data transfer, prompting the requester for an information label. If not an incremental transfer or subsequent to the first part of the incremental transfer, window shown in FIG. 12 is displayed, and the property is transferred from the shadow window to the requester window in function block 419 following the protocols described with respect to FIGS. 2 and 3.

Briefly summarizing, if the user is not authorized for the downgrading or upgrading cut-and-paste operation, the Selection Manager puts up the alert box shown in FIG. 5, writes an audit event noting the denial, and sends a SelectionNotify event with property None back to the requester, thus terminating the selection process. If the MAC check succeeds, then the Selection Manager performs the DAC access check. If the requester window/property does not allow write access to the owner, a DAC dialog pop-up shown in FIG. 7 asks if the user wishes to grant to the owner process write access to the requester's window or property. If the user answers in the affirmative, this has the effect of giving the owner the requester's write access to the window/ property, and an audit event for use of privilege (note that the Selection Manager is DAC exempt) is generated. This is allowed for any window that supports the paste operation regardless of the access control list (ACL) since the user is allowed to perform cut and paste operations when there are no MAC problems. If the system is not configured to bypass DAC, the warning shown in FIG. 8 appears, the selection fails, and an audit event is generated. If the above MAC and DAC checks succeed, then the Selection Manager creates a "shadow" window and property which is used for the cutting and pasting operation. This new window and property are given the selection owner's security attributes, such as the owner's MAC level, etc. This ensures the selection owner will be able to write out the selection data. (Since the Selection Manager is privileged, it always has access to this window and property.) This "shadow" window and property ID is used instead of the requester's window and property ID for all the subsequent events that get sent to the selection owner. This shields the requester's window and property IDs from the owner so that the owner is not able to ascertain IDs of windows and properties which may be at a different MAC levels. The Selection Manager then inserts these IDs in place of the requester's IDs in creating the SelectionRequest event that it sends to the data owner. The Selection Manager also solicits PropertyNotify events on the requester's window so it can intercede in the sending of these events to the data owner and insert the "shadow" window and property IDs.

When the owner receives the SelectionRequest event, the data owner posts the data onto the "shadow" property by using the XChangeProperty call. The selection owner then sends a SelectionNotify event to the requester using the "shadow" window and property IDs indicating to the requester that the data has been posted to the property. This SelectionNotify event is intercepted by the X Server, and the X Server in its place sends to the Selection Manager the newly defined SelectionLabel event which includes the information labels of the requester client and the requester's window and the information label of the owner client. (This is done to eliminate the need for additional queries by the selection manager.) When the Selection Manager receives the SelectionLabel event, it first changes ownership of the data to itself. This prevents any accidental or intentional modification of the data by the Selection Manager. In particular, this prevents a conniving selection owner from presenting innocuous data for user approval, then secretly inserting sensitive data after approval, but before the data has been actually transferred to the requester. The Selection Manager compares the information label of the selection data to either the destination's window's output information label or to the input information label or the requester client's information label, depending on the configuration option that was selected in the Selection Manager's system administration resource file. If configured to prompt for information labels, the Selection Manager puts up the dialog box shown in FIG. 10 asking the user for the information label of the data.

As indicated, this dialog box allows the user to change the selection's label information as desired. If OK is chosen, the selection is relabeled (if necessary) and an audit event written. If Cancel is chosen, the selection is deleted (as per the ICCCM) and a SelectionNotify event with property None is sent to the requester. The option Take copies the corresponding displayed window label onto the selection label (which maybe further edited). If the user enters an invalid label, then an "Invalid label please re-enter" message will appear in the message area of the error pop-up, an audit event is generated, and the user has the opportunity to re-enter the label. This message also appears if the information label entered for the data is above the MAC level of the requester's property (an audit event is also generated for this case). The user is also given the opportunity to view the data before the user selects the information label for that data. (The Selection Manager supports the following "standard" forms: text, bitmap, pixmap, and integers. Support for other types may be added by incorporating type specific handlers. All unknown data types are displayed as ahex dump.) If the data is to be viewed, the Selection Manager puts the data from the property into the "shadow" window and displays it in the window shown in FIG. 12.

If the user clicks on the change information label subwindow, then the user can label the selection data interactively while the data is being viewed. If the user never gets prompted for the information label (i.e., if the system administrator has configured the option in the resource file to disallow for prompting for information labels), the selection continues even if the information labels are different (i.e, the label of the selection data is chosen by default), but an audit event noting this difference will be generated.

After the Audit Manager completes its initialization process, the Audit Manager posts a root window property which tells the Selection Manager, the X Server, and the other privileged clients that the Audit Manager is ready to accept auditing events. After the Selection Manager checks for this root window property, the Selection Manager sends audit information to the Audit Manager using the newly defined AuditNotify events. The AuditNotify event indicates why the event is being generated (e.g., for the use/abuse of privilege, relabeling of data, etc.). It also contains the "shadow" window and property IDs as well as the window and property IDs of the source and destination windows. If the AuditNotify event is being sent by the Selection Manager as part of the normal cut and paste process (i.e., no violations, no use of privilege) as indicated in Step 8 in FIGS. 2 and 3 described above, then no audit data has to be posted. If the cutting and pasting involved a MAC label downgrade (i.e., if the user had the downgrader privilege), then, because of CMW requirements, the selection data must also be included in the audit record. Therefore, the Selection Manager includes the "shadow" window and property IDs in the audit event. The Audit Manager uses these to obtain a copy of the data and put it to the audit trail. (If the data is too much for one audit record to handle, then a link to the next record is included in the original record.) Then the Selection Manager waits until the Audit Manager sends back to it a ClientMessage event with an AuditNotify type indicating to the Selection Manager that it has completed creating the audit record and attaching it to the audit trail buffer.

After the Selection Manager receives the ClientMessage event from the Audit Manager, the Selection Manager calls the newly defined Xlib call XTransferProperty to move the data pointer from the "shadow" property to the property associated with the requester's window. The property is thus made accessible to the requester. If the XTransferProperty call fails, then the Selection Manager creates and sends to the requester a SelectionNotify event marked None. If no error is returned from the XTransferProperty call, then the Selection Manager creates and sends to the requester a SelectionNotify event which includes the requester's window and property IDs. As per ICCCM requirements, the requester reads the data from the property and deletes the property, which causes a PropertyNotify event to be sent. Once the Selection Manager receives the PropertyNotify event, the Selection Manager deletes the "shadow" window and property. If the owner is soliciting PropertyNotify events on the "shadow" window, then once the owner receives this event the owner knows that the selection operation has been completed.

Incremental cut and paste proceeds in the same way as nonincremental cut and paste as shown in the section above until the point where the owner is posting the data onto the "shadow" window. If the owner wishes to send the data incrementally, then the owner includes the INCR type in the SelectionNotify event and the size of the transfer. The X Server then includes this in the SelectionLabel event. After the Selection Manager prompts for the information label for the first segment as shown in FIG. 9 described above, the user is asked to select options for the incremental transfer using the pop-up shown in FIG. 10.

The user has the choice of having the information labels dialog box (FIG. 11) for each transfer or not having any further information label pop-ups appear. When the Selection Manager sends the SelectionNotify event to the requester, it includes the type INCR and the length of the data in the selection. Then the incremental transfer proceeds with, if necessary audit events and information label pop-ups being generated for every incremental transfer until all the data has been sent. When the owner is done transferring the data, a PropertyNotify event for the "shadow" property gets sent with a length of zero (The Selection Manager never puts up the information label dialog box if the property transferred has a length of zero, since by definition an object with no data in it has an information label of System Low.) When the Selection Manager receives the PropertyNotify event with a length of zero for the requester's property, the Selection Manager knows that the last part of the data has been deleted by the requester. Then the Selection Manager deletes the "shadow" property and window. The owner then receives the PropertyNotify event of zero length for the "shadow" property, assuming that the owner is soliciting this event. Then the incremental transfer is complete.

If the requester lists MULTIPLE as the target in the XConvertSelection procedure, the requester is asking the owner to transfer the selection to several properties at one time instead of having to send several XConvertSelection requests. This will only be allowed if the requester and the owner are at the same MAC levels; the X Server will not generate fake IDs for multiple requests. The only change from that listed above is that when requesting the new information label for the data to be pasted, the window manager will put up a box listing all the properties where data is to be transferred, with one of the properties highlighted. When the requester presses a button, the dialog box shown in FIG. 11 will appear for the highlighted property so that the requester can enter the new information level for the data. This proceeds until all the data for the properties have been relabeled. Note that multiple requests will only work with properties which are all at the same MAC level, and that the change of label for each property will generate audit events.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A regrading selection mechanism for a secure windowing system comprising:

a plurality of client programs running in separate window on said windowing system, each of said programs displaying data within its window;

a client called a Selection Manager for cutting and pasting operations to transfer data from one client program window to another client program window, the Selection Manager meeting Compartmented Mode Workstations (CMW) requirements and sending events to applications to notify the application of any changes in state, said Selection Manager manipulating ownership and other security properties of data being transferred to allow a controlled verifiable data transfer to take place;

wherein the windowing system uses dummy window identifications (IDs) in communicating to a lower level process during a Mandatory Access Control (MAC) upgrade operation.

2. The regrading selection mechanism recited in claim 1 wherein, for all regrading operations, the windowing system will, before a selection has been transferred, send an event to the Selection Manager that causes the Selection Manager to put up a pop-up requesting user confirmation before the transfer is allowed to proceed.

3. A method for secure transfer of data having security attributes in a secure windowing system comprising the steps of:

receiving by the windowing system a request for a data transfer from a requester having a predefined security level for access to data; and creating by a client program called a Selection Manager running on said windowing system a special window and property which inherit a selection owner's security attributes, said special window being made available to the selection owner so that window and property identifications (IDs) that were specified by the requester are concealed from the selection owner preventing the owner of the selection from obtaining any security relevant information about the requester when the requester is communicating with a lower level process on a Mandatory Access Control (MAC) upgrade.

4. The secure data transfer method recited in claim 3, further comprising the steps of:

transferring by the selection owner the selection data to the Selection Manager, the Selection Manager becoming the owner of the data and having exclusive rights to it until the transfer is completed; and providing a user interface that allows a logged in user to examine the data being transferred from the selection owner to the selection requester and, for regrading operations, requests user confirmation before the data transfer is allowed to proceed.

5. The secure data transfer method recited in claim 4, further comprising the step of generating audit events when operations involving the use of MAC downgrading is attempted and also when security violations involving data transfers and reclassifications are committed.

6. The secure data transfer method recited in claim 5, further comprising the step of providing a selection mechanism having sufficient privilege to override discretionary access control (DAC) write access restrictions on the requester's window and property.

7. A method of secure transfer of data having security attributes in a secure windowing system between a Selection Requester and a Selection Owner comprising the steps of:

issuing by the Selection Requester request which is forwarded to a client called a Selection Manager running the windowing system;

displaying by the Selection Manager Mandatory Access Control (MAC) and Discretionary Access Control (DAC) dialogs;

creating by the Selection Manager a property on its own window that the owner of the selection can later post the selection on and then generating a selection request and sending the selection request to the selection owner as the originally intended recipient;

in response to the selection request, posting by the selection owner the selection data on the Selection Manager's property and issuing a selection notify event to the Selection Manager;

allowing the user to examine the data being passed from the Selection Owner to the Selection Requester so that the user can permit the request to pass unmodified, cancel the request or down grade the data being transferred;

generating an audit event in the event of a cancellation of the request by the user;

transferring by the Selection Manager the selection data from its own window/property to the selection requester's window/property and issuing a notification to the requester of the selection's availability on the property;

reading by the Selection Requester the data and then issuing a notification to the Selection Manager; and notifying the owner by the Selection Manager of the completion of the data transfer.

8. The secure data transfer method recited in claim 7 wherein said step of transferring by the Selection Manager is performed incrementally, further comprising the step of prompting the user to specify whether each transfer is to be separately labeled.

* * * * *